(12) United States Patent
Hinrichs

(10) Patent No.: US 7,827,345 B2
(45) Date of Patent: Nov. 2, 2010

(54) SERIALLY INTERFACED RANDOM ACCESS MEMORY

(76) Inventor: Joel Henry Hinrichs, 5027 Hackamore Dr. North, Colorado Springs, CO (US) 80918

(\*) Notice: Subject to any disclaimer, the term of this patent is extended or adjusted under 35 U.S.C. 154(b) by 418 days.

(21) Appl. No.: 11/486,897

(22) Filed: Jul. 14, 2006

(65) Prior Publication Data

US 2007/0067554 A1    Mar. 22, 2007

Related U.S. Application Data

(60) Provisional application No. 60/705,314, filed on Aug. 4, 2005.

(51) Int. Cl.
*G06F 13/00* (2006.01)
*G06F 12/00* (2006.01)
*G11C 5/06* (2006.01)

(52) U.S. Cl. ............... 710/316; 711/104; 365/63

(58) Field of Classification Search ............ 710/316, 710/317; 711/5, 104, 105; 365/219–221, 365/63
See application file for complete search history.

(56) References Cited

U.S. PATENT DOCUMENTS

| | | | | |
|---|---|---|---|---|
| 5,226,125 | A | * | 7/1993 | Balmer et al. ............... 710/317 |
| 5,377,154 | A | * | 12/1994 | Takasugi ..................... 365/221 |
| 5,761,455 | A | * | 6/1998 | King et al. .................. 710/316 |
| 5,875,470 | A | * | 2/1999 | Dreibelbis et al. .......... 711/147 |
| 5,968,114 | A | * | 10/1999 | Wentka et al. ............... 718/100 |
| 5,991,186 | A | * | 11/1999 | Balistreri et al. ............ 365/78 |
| 6,038,630 | A | * | 3/2000 | Foster et al. ................. 710/317 |
| 6,208,545 | B1 | * | 3/2001 | Leedy .......................... 365/51 |
| 6,551,857 | B2 | * | 4/2003 | Leedy .......................... 438/109 |
| 6,650,593 | B2 | * | 11/2003 | Takemae ................. 365/233.16 |
| 6,747,887 | B2 | * | 6/2004 | Halbert et al. ................ 365/51 |
| 7,023,743 | B2 | * | 4/2006 | Nejad et al. ............ 365/189.08 |
| 7,123,497 | B2 | * | 10/2006 | Matsui et al. ................. 365/51 |
| 7,139,183 | B2 | * | 11/2006 | Taussig et al. ................ 365/51 |
| 7,526,597 | B2 | * | 4/2009 | Perego et al. .................. 711/5 |
| 2002/0024832 | A1 | * | 2/2002 | Nagaoka ...................... 365/63 |
| 2003/0169731 | A1 | * | 9/2003 | Wickeraad ................... 370/359 |
| 2004/0103255 | A1 | * | 5/2004 | Howlett ....................... 711/156 |
| 2005/0285174 | A1 | * | 12/2005 | Saito et al. ................... 257/296 |
| 2006/0161743 | A1 | * | 7/2006 | Fekih-Romdhane et al. 711/154 |

\* cited by examiner

*Primary Examiner*—Mark Rinehart
*Assistant Examiner*—Trisha Vu

(57) ABSTRACT

A serially interfaced massively parallel Random Access Memory (RAM) includes a matrix of control logic sections on one integrated circuit die, augmented by a switching matrix with an external interface to multiple high speed serial signaling means. A matrix, of the same dimension, of dense memory element arrays is implemented on a different integrated circuit die. One control logic section die and one or more others containing memory sections are joined by appropriate means to form one integrated circuit stack, implementing a matrix of independent memory units. The switching matrix translates command and data content encoded on the external signaling means bidirectionally between internal data and control signals and connects these signals to the control logic sections. Each independent memory unit ably performs atomic read-alter-writes to enable software mutual exclusion operations (MUTEXes). Each and every matrix may guard against defects by having additional rows and/or columns.

17 Claims, 8 Drawing Sheets iiiiiiii MMMMMMMM bbbbbbbbbbbbbbbbbb FF ssssss NNNNNNNN

90

92

ADDRESS: 48 Cells, allocation arbitrary (example:)
   IC selector    iiiiiiii
   DRAM selector  MMMMMMMMMMMMMMMM
   BYTE selector  bbbbbbbbbbbbbbbbbbbbbbbb
FUNCTION: 2 Cells encode the commanded operation
   FF   00: READ             01: WRITE
       10: READ/ALTER/WRITE  11: RETURNED DATA
SOURCE:   6 Cells identify one of up to 64 originating devices
   originator ID ssssss
COUNT:    8 Cells indicate 1 to 256 total bytes
   byte count      NNNNNNNN

SERIALLY INTERFACED RANDOM ACCESS MEMORY

RELATED APPLICATIONS

The present invention claims priority on provisional patent application Ser. No. 60/705,314, filed on Aug. 4, 2005, entitled "Serially Interfaced Random Access Memory" and is hereby incorporated by reference.

FIELD OF THE INVENTION

The present invention relates generally to the field of integrated circuit memories and more particularly to an arrangement of elements which provides a Random Access Memory integrated circuit with a high speed serial interface.

BACKGROUND OF THE INVENTION

Random Access Memory (RAM) tends to be an integrated circuit (IC) technology in which individual dense memory storage cells, such as capacitive cells, are grouped into various two-dimensional matrices, such that the state of each memory cell may easily be read and/or altered. Very early RAMs held perhaps a few thousand bits; today RAM size has advanced roughly one-million fold: RAMs are now available with more than 1 billion bits on a single silicon die. But during the evolution of RAM technology there has been a massive skew in the difference between some RAM cycle times, in particular capacitive cell Dynamic RAM (DRAM), and the cycle times of other ICs used in a (computing system, such as Central Processing Unit (CPU) and/or Input/Output Control (IOC) circuits which access the DRAMS. While DRAM performance has increased very little, CPU and IOC circuit speeds have increased by several powers of ten.

The performance discrepancy is in part due to reliance on a RAM architecture which has passed a point of diminishing returns. Each new generation of RAM chips uses a set of parallel paths by which address and data signals arrive at the chip, and/or by which data signals leave the chip. Any RAM interface, no matter what its design or construction, must convey address information, which at present requires slightly less than 30 bits. It must also include a data word of typically 16 or 32 bits; current interfaces present all or a major portion of these bits as separate, parallel signals, one signal per pin. Some arrangements use additional qualifying signals on other pins such that the data and address signals may share pins; this trades off pin count, i.e. the fewer pins the better, against overall interface complexity, which is increased, and latency, which is also increased, when multiple sets of information must use the same pins. Thus each increase in RAM density must either increase the pin count or add complexity and latency to the interface. Even the most powerful current RAM interface, known commonly as RAMBus®, uses a fixed set of parallel signaling lines.

Use of many parallel signal paths further demands that they be used in the nature of a "bus", i.e. physical signal paths are used to pass signals in both directions depending on an operational phase, and many individual ICs are connected to each physical signal path. Large amounts of power are necessary to successfully drive each bus signal, relative to the power needed to drive a signal in only one direction and only from one IC to one other IC. Further, a relatively long time is needed to drive each bus signal across a lengthy physical path and register successfully on each of the many sensing circuit elements. Since there may be many such paths operating in parallel, they also occupy large amounts of physical space on the chip edge and on the printed circuit board; the bulk and power demands of this style of interface impose severe physical limits on the advance of total system memory bandwidth.

Internally the memory cells of a RAM tend to occur in two-dimensional patterns of rows and columns. For instance, to read a RAM it is necessary to select and stimulate a single row; each cell on that row then dumps its data load onto a sense line which descends a column sense line to the bottom of the array, and when all sense lines have taken a stable state the bits of that row are known. A read operation may have to immediately restore these states, if e.g. it has emptied each element in the selected row; a write operation may tend to initiate a read to clear all bits, then replace the old states with new data and perform the "restore" step.

In fact a chief obstacle impeding improvement in CIRAM performance has been the relatively poor quality and large size of the random logic circuit elements on the DRAM die, which tends to use a Negative Metal Oxide Semiconductor, or NMOS, integrated circuit process. NMOS makes possible a very dense array of capacitive cells; but also produces slow, bulky logic gates.

Thus there exists a need for an improved random access memory that has considerably faster cycle times than present DRAMS.

SUMMARY OF THE INVENTION

A random access memory that overcomes these and other problems combines IC's from separate logic families, e.g. NMOS and CMOS, and bonds two or more IC's of one or more IC logic families together to form an IC stack. The IC stack is a practical means to provide RAM or DRAM control logic circuit elements using CMOS technology without placing them on the memory cell die, hence using NMOS technology to implement them. Placing the control logic elements on their own die as part of an IC stack with one or more memory cell ICs makes it possible to construct a RAM IC as a large matrix of fast, independently acting smaller matrices to make a massively parallel RAM. Each RAM unit matrix can be relatively much smaller in both dimensions, which provides faster cycle times.

A single RAM IC capable of performing many parallel operations also creates a corresponding need to transfer many times mare address and data signals to and from the IC stack. Changing the interface from a wide complex bus arrangement to a plurality of serial point-to-point unidirectional (PPUD) channels greatly enlarges the overall data density of the signals passing between e.g. CPU and RAM. Thus using very high speed serial PPUD signal connection pairs to construct the external interface to the RAM IC stack provides a practical way to transfer a relatively enormous flow of control and data bits between a RAM IC stack and other ICs such as the CPU, one or a plurality of I/O devices (IOCs), etc. The net data communicated per signal path per unit time can be far greater when the signal paths are PPUD; hence by constructing the RAM interface to use serial PPUD connection pairs it becomes feasible to connect one IC stack RAM to many parallel command and data streams, and for each of these data streams to carry relatively large amounts of data. One possible serial technique for doing this is, or resemble, PCI Express®.

The IC stack mating a suitable random logic IC to one or a plurality of memory cell ICs each having a highly parallel matrix of memory cell matrices will have both a reduced time needed to read or write any RAM location, and a much greater total number of differently located RAM data bits that can be read and/or written simultaneously.

In a preferred embodiment a memory is made of an IC stack and takes the form of one control logic IC and one or a plurality of memory cell IC's, each a grid of independently acting memory cell arrays, where the grid is a rectangular arrangement whose width and depth may each tend to be powers of two. For example, an arrangement of 32 by 32 results in an array of 1,024 independent memory arrays. By virtue of having to stimulate only a very small fraction, such as 1/32, of the width of the IC each row selector drive circuit has a smaller, easier, quicker task to perform than in prior generations of IC memories. Further, by virtue of each cell having to drive its information across only a small fraction, such as 1/32, of the length of the IC, the sense operation of each memory column is also simpler, easier, and faster.

The high speed serial PPUD connection pair uses, in one embodiment, one complementary signal pair to pass signals in one direction and a second such pair to simultaneously pass signals in the reverse direction. Each signal may consist of a word of 40 raw bits encoding and 32 information bits. Two such connections acting together may pass a 64 bit information word in each direction in 40 raw bit times. In the case of a connection designed to interface a using IC, such as a CPU, an IOC, or a multiplexer such as a Memory Interface Controller, the 64 bit word may contain address bits which identify one of a number of daisy-chained IC stack RAMS, plus sufficient address bits to select one RAM unit on that IC stack, plus sufficient address bits to select a byte or string of bytes in that RAM unit, plus sufficient bits to encode some reasonable number of contiguous bytes, plus control information commanding e.g. Read, or Write, or an atomic Read-Alter-Write operation. Taking 'Read', 'Write' and 'Read-Alter-Write' as three of the four possible states of a two bit code leaves a fourth command code which may indicate that data is being returned to a requestor in response to a Read or Read-Alter-Write command.

A commanded read operation may consist of a single 64 bit message. When a commanded read operation is complete, the individual RAM control logic returns an appropriate sequence of words sufficient to identify the source and to contain the requested string of information bytes. For instance the first word may repeat the original command but change the function, such as to indicate that data is being returned, and a number of other following words determined by a byte count field in the original command may complete the return message. When a commanded operation includes writing, the originating command sequence includes data words containing the byte or bytes to be written. The number of data words may be determinable by a byte count field in the write command word. Each such write or returning read data sequence may pass as one contiguous message.

PCI Express™ flexibly allows link widths of various powers of two. A flexible arrangement of signaling elements, such as defined by PCI Express, enhances the ability of the elements within an IC stack RAM to transfer large amounts of data. While serial PPUD signals are preferable to "bus" signals when separately packaged ICs communicate with each other, the nature of an IC facilitates connecting the internal array of RAM units via a parallel arrangement resembling a bus, but using PPUD elements. In one embodiment, these connections are made via a Switch Matrix circuit on the IC.

A Switch Matrix circuit may accept one or more input serial connections. Appropriate additional connections may be used as a daisy-chain to connect multiple IC stack RAMs, allowing simple construction of a traditional SIMM or DIMM printed circuit card containing a plurality of IC stack RAMS. A power-on discovery sequence may be constructed to disclose a specific board-level organization of the using ICs connected to the memory IC stacks. In addition, the discovery sequence may also enhance the ability of an IC stack RAM to make itself known to the IC or ICs using it, including other IC stack RAMs connected in a daisy-chain fashion.

Internally to the control logic IC, a grid arrangement may connect each row of RAM Control Logic sections as an internal daisy chain. Externally, another PPUD pair daisy chain connection, while doubling the number of interface pins on the IC stack, enables one printed circuit board path to reach a plurality of IC stack RAMS. The time lost in daisy chain latencies both external to the IC and internally between RAM Control Logic sections is smaller than the overall performance gain derived from there being parallel active signal paths to each IC and massively parallel internal operational capability. Current RAM IC data sheets list read and write access times of many tens of nanoseconds.

Manufacturing defects tend to result in a significant number of rejected DRAMs. A foundry line is considered successful when 90% of the ICs are found to be functional, and only 10% have e.g. a defective row, column, or cell. When a die in an IC stack that is five ICs deep, e.g. one control logic IC and four memory cell ICs, has one chance in ten of a flawed row, column, or cell, then the probability of a defect-free IC stack would be 90% to the fifth power, or about 60%; and the further probability of such an IC stack with only one die having one row, column, or cell defective is 32 of the remaining 40 percents; hence such an IC stack, wherein each die has a 90% probability of being functionally perfect, could have a 92% probability of being functionally perfect, given that due to the highly parallel nature of this approach, each IC could be designed as a 33×33 matrix capable of shedding one defective row and/or column during post-manufacturing construction. The benefit of a massively parallel implementation is that even when stacking multiple ICs prior to effective test and selection (such as stacking and bonding entire wafers prior to IC test and selection) net foundry production of good parts is likely to rise rather than fall.

BRIEF DESCRIPTION OF THE DRAWINGS

FIG. 3 is a diagram illustrating one possible command/response format for the serial link connecting the IC stack RAM to the other ICs in a typical processing system;

FIG. 4 is a block diagram of a highly parallel matrix of individual memory cell arrays, on an integrated circuit in accordance with one embodiment of the invention;

DETAILED DESCRIPTION OF THE DRAWINGS

The present invention overcomes the limitations of present RAM interface architectures by having a number of independent RAM control logic sections coupled together with a large plurality of small independent RAMS. First the memory speed is increased by virtue of the very small physical size of each of the independent RAMs; and second the effective memory speed is increased by virtue of massive parallelism wherein each small RAM truly operates independently of all the others.

Figure 1:
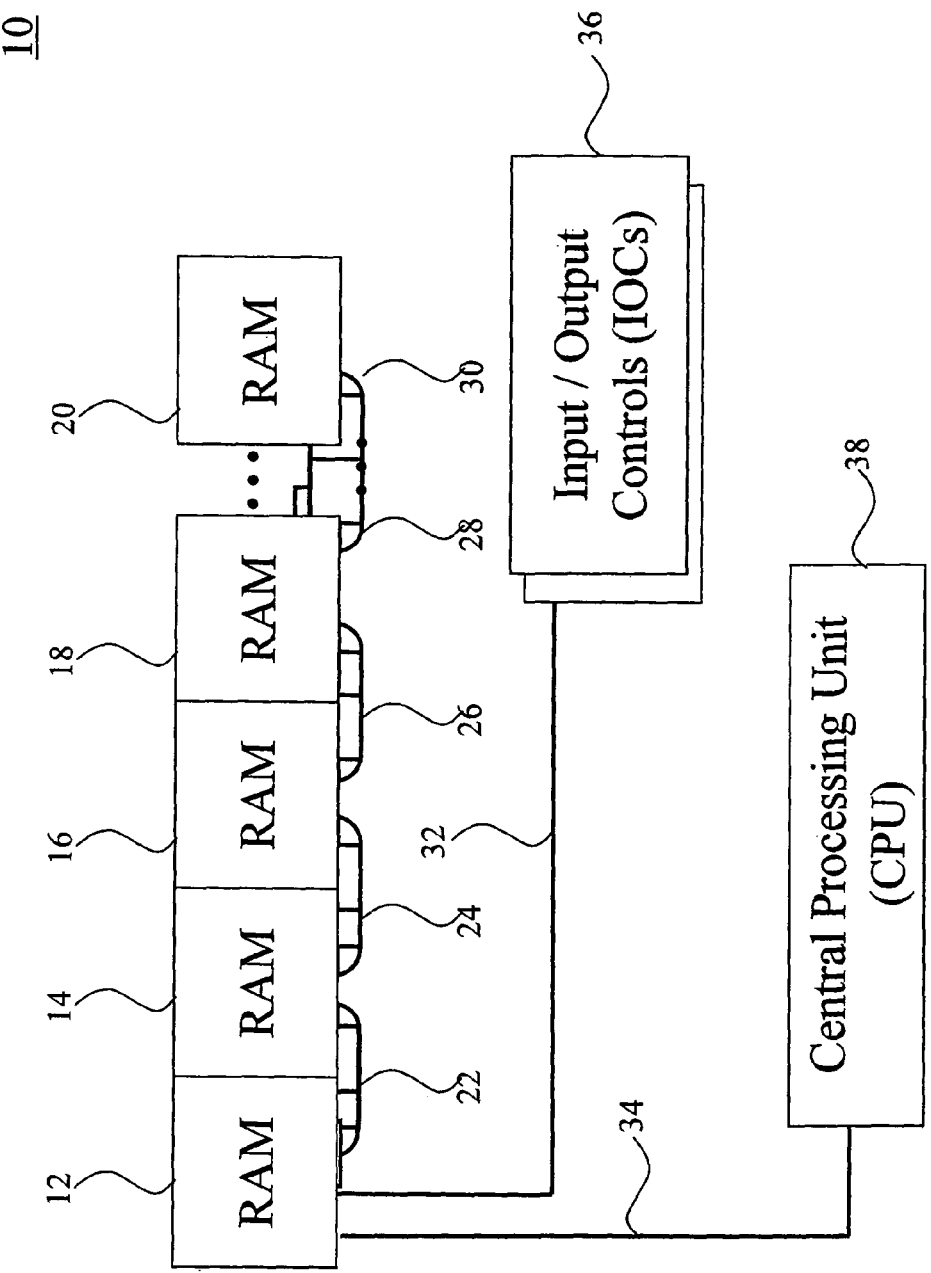
FIG. 1 is a block diagram of a processing system having a plurality of RAMS, a plurality of IOCs, and a CPU in accordance with one embodiment of the invention.

FIG. 1 is a block diagram of a processing system 10 which illustrates the simple nature of the signals connecting an IC stack RAM1 made according to this invention to other ICs in a typical small computing system. The processing system 10 has a plurality of IOCs 36, a CPU 38 and IC stack RAMs 12, 14, 16, 18, 20, which are interfaced to each other via high speed PPUD signal path pairs 32, 34. Other high speed bi-directional PPUD signal path pairs 22, 24, 26, 28, 30 connect the IC stack RAMS 12, 14, 16, 18, 20 to each other in daisy chain fashion.

Figure 2:
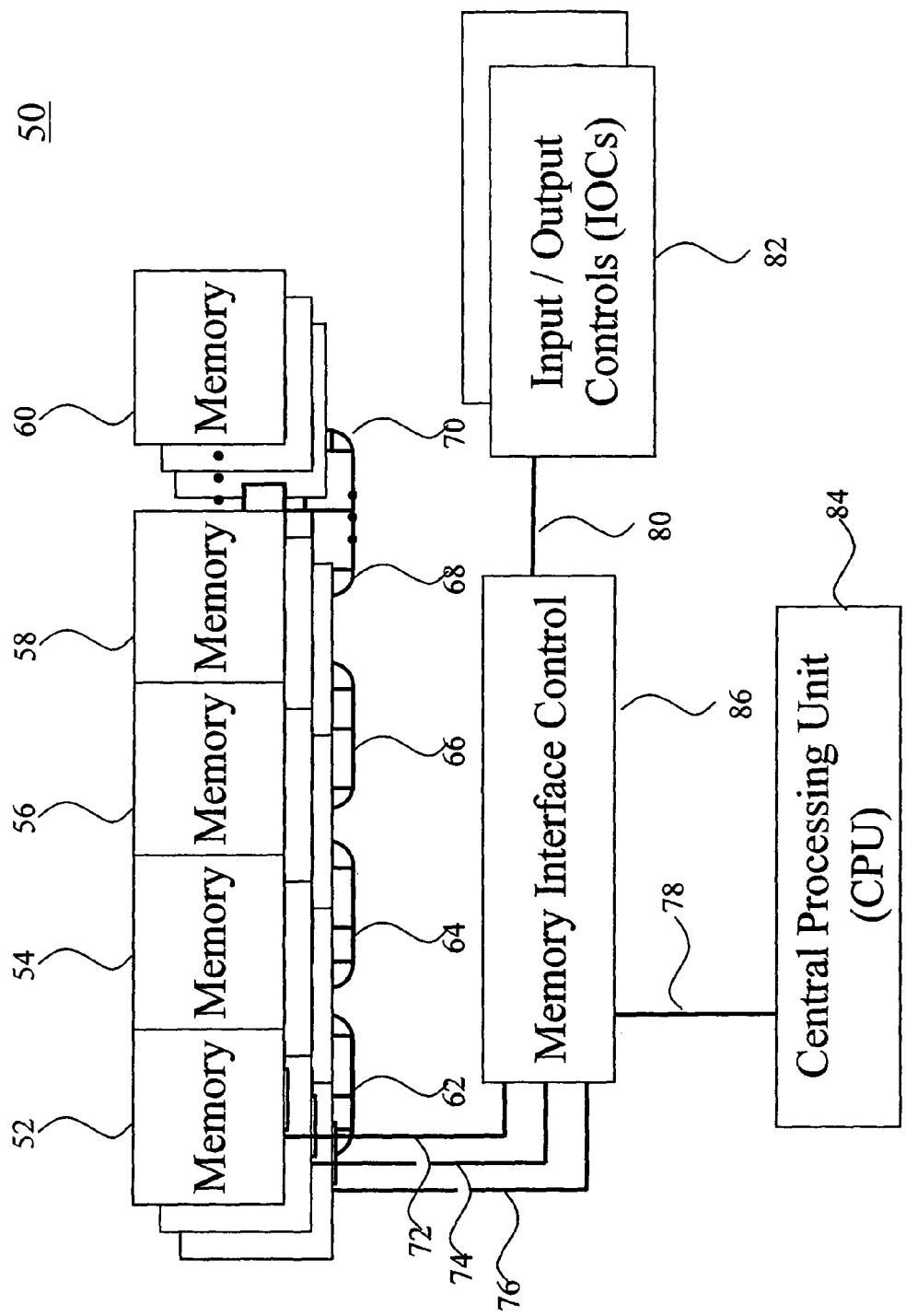
FIG. 2 is a block diagram of a processing system having a plurality of RAMS, a plurality of IOCs, a RAM Interface Control and a CPU in accordance with one embodiment of the invention.

FIG. 2 is a block diagram of a processing system 50 which illustrates the simple nature of the signals connecting an IC stack RAM made according to this invention to other ICs in a typical small computing system. The processing system 50 has a plurality of IOCs 82, a CPU 84, a RAM Interface Control IC 86 and IC stack RAMS 52, 54, 56, 58, 60, which are interfaced to each other via high speed bi-directional PPUD signal path pairs 72, 74, 76. Other high speed bi-directional PPUD signal path pairs 62, 64, 66, 68, 70 connect the IC stack RAMS 52, 54, 56, 58, 60 to each other in daisy chain fashion. Note that the RAM Interface Control IC 86 sends and receives high speed serial link words and performs routing using address bits in the first word of a command or response sequence to route each word or sequence of words to the correct recipient. The memory interface control 86 allows the number of serial interface signals 72, 74, 76 to be configured to meet the requirements of the CPU 84 and the requirements of the input/output devices relative to the expected data traffic loading of each in a given PC board design.

FIG. 3 illustrates a command format 90 containing a 64 bit format 92. The format 92 only requires 64 bits to be sufficient to provide a complete and succinct command and control interface. The format makes possible, with a single interaction, rapid exchanges of information as small as one byte and as large as a maximum of (as illustrated) 256 bytes or more, depending on the arrangement of the fields within the command format. Four function1 codes are available to indicate not only standard read and write but also the atomic operation required to implement software mutual exclusion or MUTEX primitives; a function code is also available to unambiguously identify data being returned in an answer to a prior read operation. A field in the format identifies the source of a command, or the target of a reply to a command, and facilitates the presence of a RAM Interface Control IC by enabling it to perform a switching function. A count field makes it possible to precisely read or write a single byte, yet powerfully operate on a long sequence of bytes with a single command overhead. Finally, the illustrated format provides sufficient address bits to span 256 Terabytes. By leaving the interpretation of these address bits up to discovery-time negotiation between the using ICs and the IC stack RAM or RAMS, a plurality of varying formats may successfully occupy parallel connections in a single system.

Figure 4:
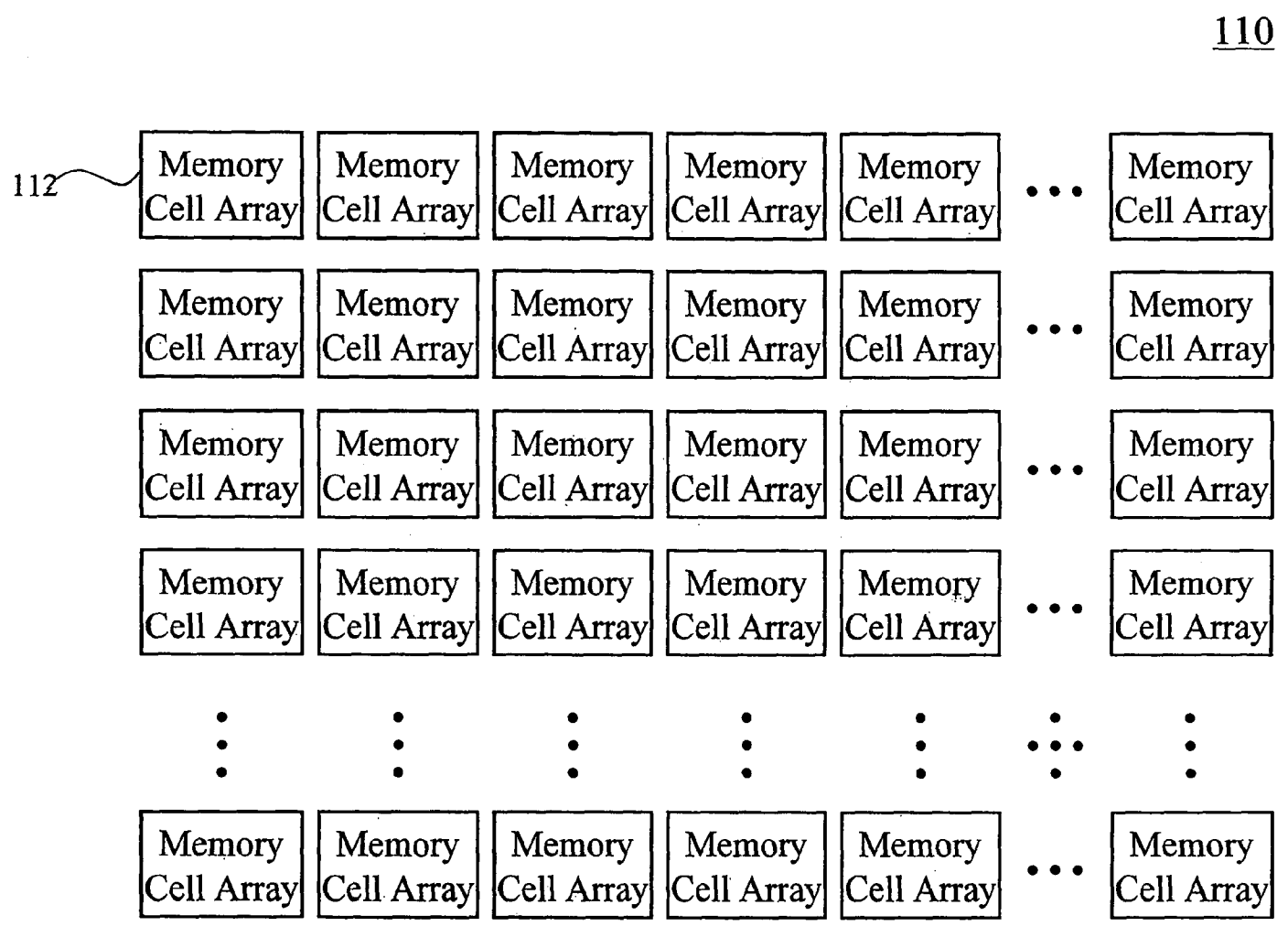

FIG. 4 is a block diagram of a large grid 110 of a plurality of memory cell arrays (such as memory cell array 112) on an integrated circuit in accordance with one embodiment of the invention. Each memory cell array, e.g. memory cell array 112, operates independently of the other memory cell arrays. This grid 110 of memory cell arrays (including memory cell array 112) may be implemented on a single integrated circuit using NMOS technology. Typically, the integrated circuit may be planar.

Figure 5:
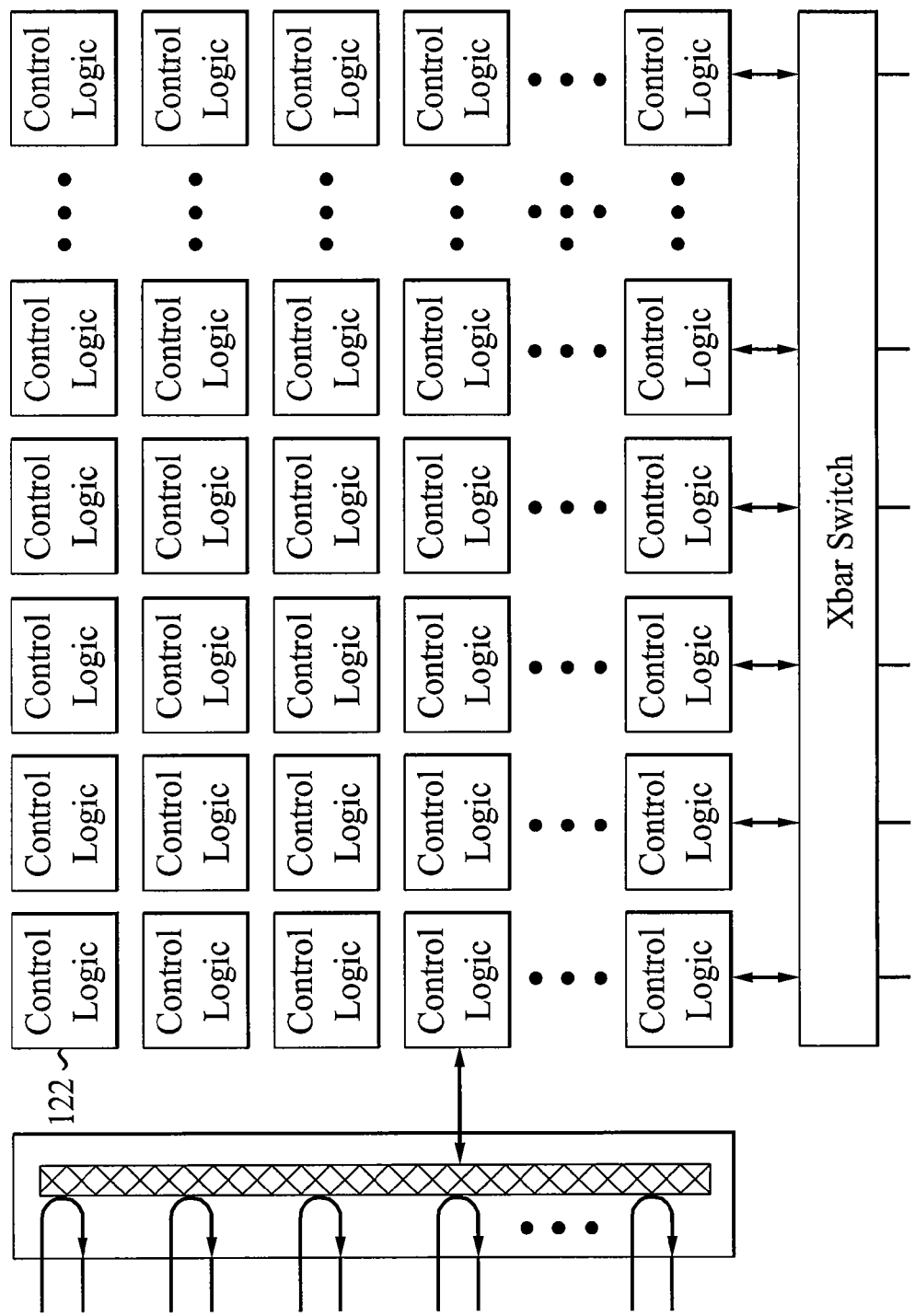
FIG. 5 is a block diagram of a highly parallel matrix of individual RAM control logic sections, on an integrated circuit in accordance with one embodiment of the invention.

FIG. 5 is a block diagram of a large grid 120 of a plurality control logic sections (such as control logic section 122) on an integrated circuit in accordance with one embodiment of the invention. Each control logic section, e.g. control logic section 122, controls one of the memory cell arrays, e.g. memory cell array 112, of FIG. 4. The control grid 120 is implemented on a separate integrated circuit from the memory cell grid 110. The control grid 120 may be implemented using CMOS technology. Typically, the control grid integrated circuit may be planar. A plurality of z-axis connections, not shown, electrically couple the memory grid 110 to the control grid 120 to form a stack of integrated circuits. The z-axis connections are substantially orthogonal to the respective planes of the memory cell array 110 integrated circuit and the control grid 120 integrated circuit.

Figure 6:
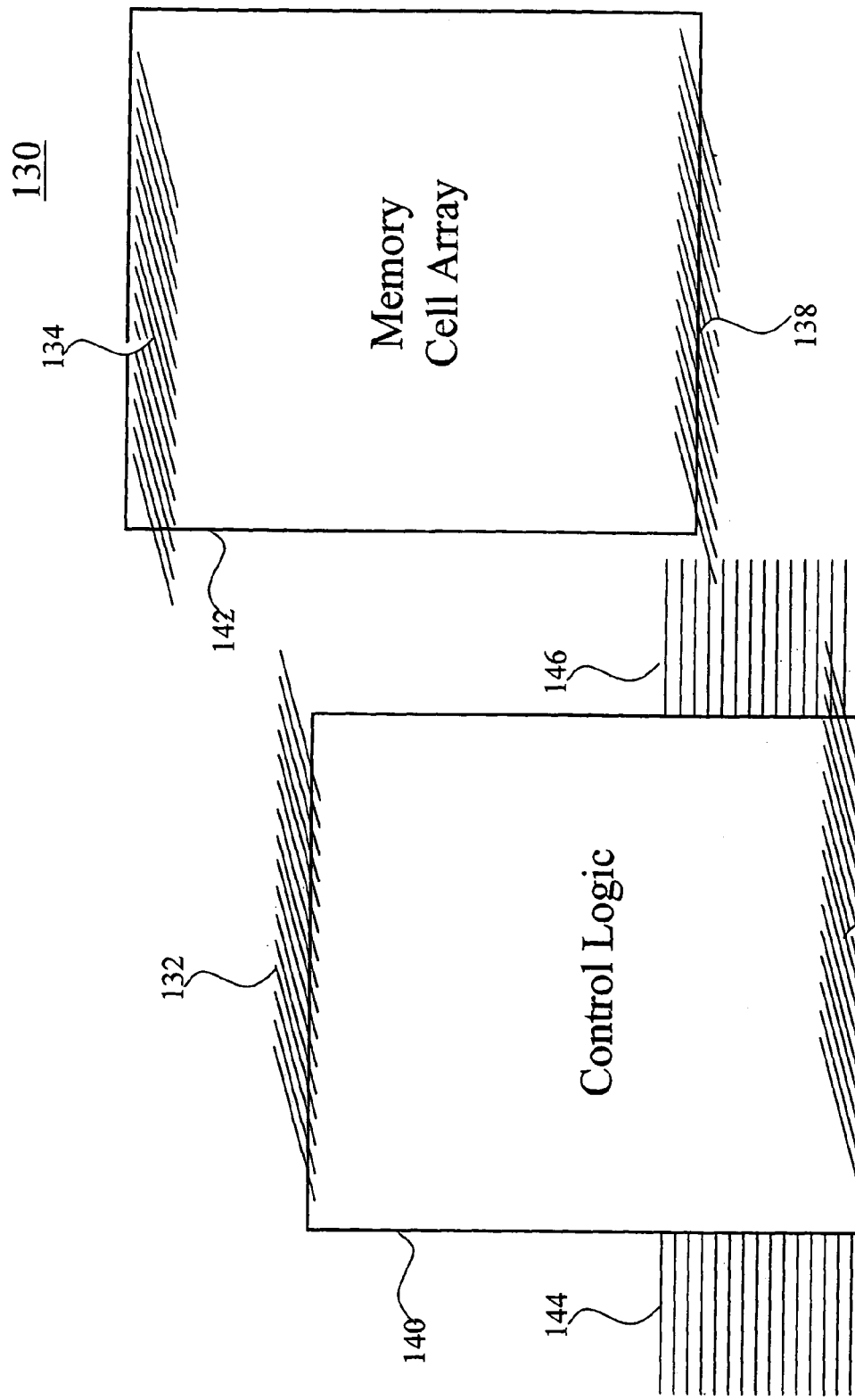
FIG. 6 is a diagram of one memory cell array on one an integrated circuit, and an individual RAM control logic section on another integrated circuit, in accordance with one embodiment of the invention.

FIG. 6 is a block diagram of a single RAM memory 130 which is part of an integrated circuit stack in accordance with one embodiment of the invention. This figure illustrates a plurality of integrated circuit connections 132, 134, 136, 138 which directly connect one control logic section 140 located on a random logic integrated circuit to one memory cell array on a memory cell array integrated circuit 142, to form an electrically contiguous and independently acting RAM memory. A plurality of integrated circuit connections 144, 146 connect the control logic section 140 to neighboring control logic sections in a daisy-chain fashion.

The integrated circuits 140 and 142 may typically be planar integrated circuits. The integrated circuit connections 132, 134, 136, and 138 may be referred to as z-axis connections. The z-axis connections 132, 134, 136, and 138 are substantially orthogonal to the respective planes of the planar circuits 140 and 142.

Figure 7:
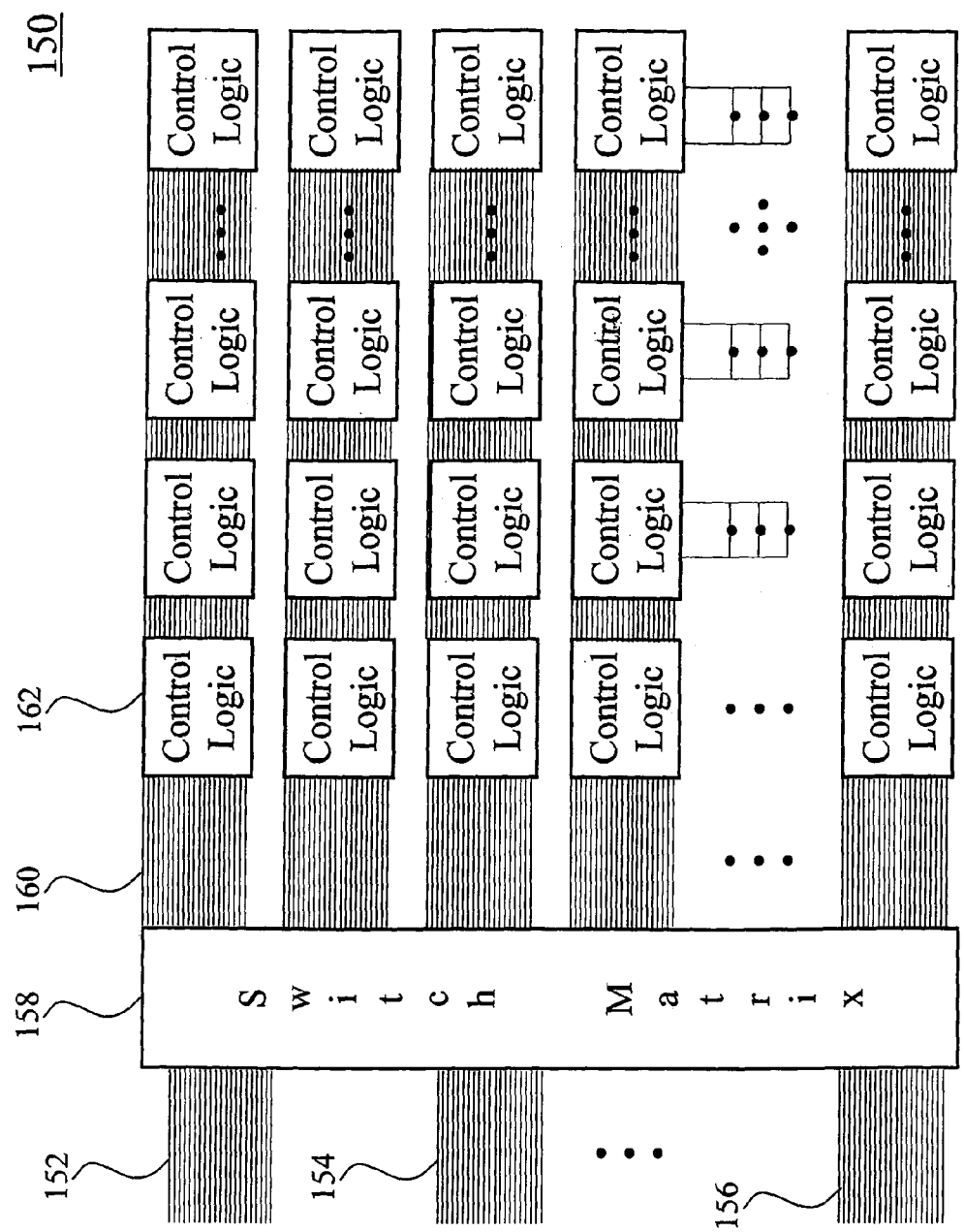
FIG. 7 is a block diagram of a highly parallel matrix of individual RAM control logic sections, including a Switch Matrix and connecting signal paths, on an integrated circuit in accordance with one embodiment of the invention.

FIG. 7 is a block diagram illustrating a control logic integrated circuit 150 representing an embodiment of the invention. A plurality of sets of external PPUD signal path pairs 152, 154, ... 156 connect the IC stack RAM to other ICs and to other IC stack RAMS in a daisy chain manner. Part of the control logic integrated circuit 150 is a switch matrix 158 which converts between a serial word-oriented format, a possible form of which was shown in FIG. 3, and a plurality of integrated circuit connections 160. The Switch Matrix 158 also routes specific command information to the correct set of internal parallel signals 160 and routes a returned data sequence from signals 160 to a correct external connection 152, 154, ... 156. The Switch Matrix 158 also resolves multiple command sequences simultaneously contending for delivery along a given set of signals 160 to a control logic segment 162. In one embodiment, these contention issues are resolved by storing some sequences while permitting another sequence to be delivered. The Switch Matrix 158 also resolves multiple reply sequences from a plurality of signals 160 simultaneously contending for access to a given external connection 152, 154, ... 156, such as via buffering them until access to the external signal connections is possible.

Figure 8:
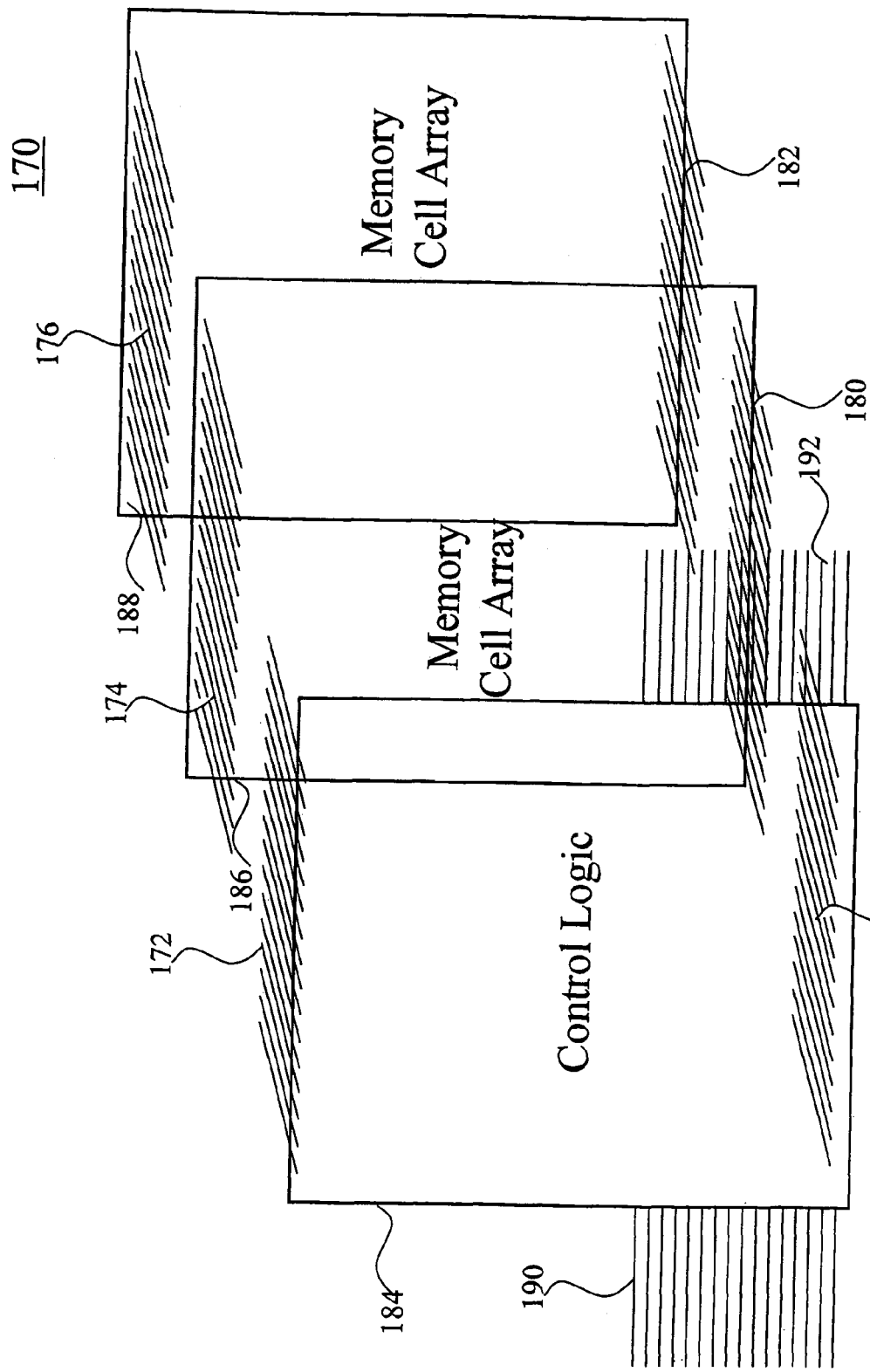
FIG. 8 is a block diagram of a plurality of RAM memories which are part of an integrated circuit stack in accordance with one embodiment of the invention.

FIG. 8 is a block diagram of a plurality of RAM memories 170 which are part of an integrated circuit stack in accordance with one embodiment of the invention. This figure illustrates the plurality of integrated circuit connections 172, 174, ... 176, and 178, 180, 182 which directly connect one control logic section 184 located on a random logic integrated circuit to memory cell arrays 186, 188 each located on a different memory cell array integrated circuit, to form an electrically contiguous but independently acting plurality of RAM memories. A plurality of integrated circuit connections 190, 192 connect the control logic section 184 to neighboring control logic sections.

Thus there has been described an improved random access memory that not only has inherently faster cycle times than present DRAMs but also allows each to operate autonomously and in parallel with all the other DRAMS.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A serially interfaced random access memory, comprising:
    a plurality of memory cell arrays on a first planar integrated circuit implemented using NMOS technology;
    a switch matrix and a plurality of control logic segments on a second planar integrated circuit implemented using CMOS technology wherein the switch matrix couples a plurality of external connections to the plurality of control logic segments; and
    a plurality of z-axis electrical connections between the plurality of memory cell arrays and the plurality of control logic segments;
    wherein the z-axis is substantially orthogonal to the first and second planar integrated circuits.

2. The memory of claim 1, wherein the external connections are serial connections.

3. The memory of claim 2, wherein the external serial connections include connections compliant with PCI Express.

4. The memory of claim 2, wherein a plurality of internal connections to the plurality of logic segments are a parallel bus.

5. The memory of claim 2, wherein the external serial connections are point-to-point unidirectional signal pairs.

6. The memory of claim 5, wherein the point-to-point unidirectional signal pairs are configurable into varying bus widths.

7. A serially interfaced random access memory, comprising:
    a plurality of memory cell arrays on a first integrated circuit implemented using NMOS technology;
    a plurality of control logic segments, one of the plurality of control logic segments controlling one of the plurality of memory cell arrays;
    a switch matrix interconnecting external signals to one of the plurality of control logic segments, to form a memory segment, wherein the control logic segments and switch matrix are on a second integrated circuit implemented using CMOS technology; and
    a plurality of the memory segments connected together in a daisy chain to form a memory unit;
    wherein individual of the plurality of memory cell arrays are operatively coupled to one control logic segment as a stack of planar integrated circuits through one of a plurality of z-axis electrical connections formed substantially orthogonal to planes of the respective integrated circuits.

8. The memory of claim 7, wherein the memory unit has a plurality of external serial signals.

9. The memory of claim 8, further including a memory interface controller coupled to the plurality of external serial signals.

10. The memory of claim 9, wherein the memory interface controller configures the plurality of external serial signals as a PCI Express interface.

11. The memory of claim 9, wherein the memory interface controller configures the plurality of external serial signals into varying bus widths.

12. A serial interface random access memory comprising:
    a plurality of memory cell arrays disposed on a first planar integrated circuit implemented using NMOS technology;
    a plurality of control logic segments disposed on a second planar integrated circuit implemented using CMOS technology and configured to control the plurality of memory cell arrays through a plurality of z-axis electrical connections between the respective planes of the first and second integrated circuits to form a memory segment; and a switch matrix on the second planar integrated circuit converting an external serial signal into an internal signal coupled to the plurality of control logic segments,
    wherein the z-axis is substantially orthogonal to the first and second planar integrated circuits.

13. The memory of claim 12, further including a plurality of memory segments daisy chained together with a plurality of serial signals.

14. The memory of claim 13, further including a memory interface controller coupled to the plurality of external serial signals and configured to operate the plurality of external serial signals as a PCI Express interface.

15. The memory of claim 13, further including a memory interface controller coupled to the plurality of external serial signals.

16. The memory of claim 12, wherein the plurality of control logic segments implement a mutex command scheme.

17. The memory of claim 12, wherein the first planar integrated circuit and the second planar integrated circuit are made by different processes.

* * * * *